United States Patent
Heiss

(10) Patent No.: US 6,310,861 B1
(45) Date of Patent: Oct. 30, 2001

(54) METHOD FOR MEASURING ATM CELL RATES

(75) Inventor: Herbert Heiss, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,623

(22) PCT Filed: Aug. 14, 1998

(86) PCT No.: PCT/DE98/02385

§ 371 Date: May 2, 2000

§ 102(e) Date: May 2, 2000

(87) PCT Pub. No.: WO99/25100

PCT Pub. Date: May 20, 1999

(30) Foreign Application Priority Data

Nov. 7, 1997 (DE) ............................................. 197 49 390

(51) Int. Cl.$^7$ ........................... H04L 12/26; H04L 12/56; H04L 25/34
(52) U.S. Cl. ........................... 370/253; 370/395; 375/287
(58) Field of Search .................................. 370/229, 230, 370/232, 235, 253, 389, 395, 255; 375/287

(56) References Cited

U.S. PATENT DOCUMENTS

| | | | |
|---|---|---|---|
| 5,276,676 | * | 1/1994 | Horn et al. ............................. 370/17 |
| 5,812,527 | * | 9/1998 | Kline et al. ........................... 370/232 |
| 5,862,127 | * | 1/1999 | Kwak et al. .......................... 370/233 |
| 5,991,268 | * | 11/1999 | Awdeh et al. ........................ 370/232 |
| 6,011,778 | * | 1/2000 | Kilkki et al. ......................... 370/232 |
| 6,094,418 | * | 7/2000 | Soumiya et al. ..................... 370/231 |

FOREIGN PATENT DOCUMENTS

| | | |
|---|---|---|
| 40 09 542 | 9/1991 | (DE) . |
| 0 548 995 | 6/1993 | (EP) . |
| 0 647 081 | 4/1995 | (EP) . |

OTHER PUBLICATIONS

Strehle, G. O., "Meßmodell zur Leistungsanalyse virtueller Transportverbindunger in realen Paketvermittlungsnetzen", Elektronische Rechenanlagen, Heft Jun. 1985, pp. 316–322.

* cited by examiner

Primary Examiner—Alpus H. Hsu
Assistant Examiner—Duc Ho
(74) Attorney, Agent, or Firm—Schiff Hardin & Waite

(57) ABSTRACT

In the transmission of ATM cells, there is often the requirement to: This measurement is usually implemented within a fixed time interval but this can be problematical insofar as this type of measurement leaves the type of connection out of consideration. The invention alleviates this situation in that the traffic characteristic of the ATM cells functions as the criterion for when a measurement is to be implemented.

4 Claims, 2 Drawing Sheets

```
IF Measurement_Started_i = FALSE
   THEN Measurement_Started_i = TRUE
           LastTS_i = TSnow
           CellCount_i = 0
      ELSE CellCount_i = CellCount_i + 1
ENDIF
IF CellCount_i ≥ N
   THEN IF ((TSnow > LastTS_i) AND
           ((CellCount_i = CellCountMax) OR (TSnow - LastTS_i ≥ TImin)))
              THEN MeasRate_i = round {CellCount_i /((TSnow - LastTS_i)(tcc·Nstep·RateGran))}
                      CellCount_i = 0
                      LastTS_i = TSnow
                      Forward the measured rate
           ENDIF
           IF ((TSnow < LastTS_i) AND
           ((CellCount_i = CellCountMax) OR (TSnow + TSmax - LastTS_i ≥ TImin)))
              THEN MeasRate_i = round {CellCount_i /((TSnow + TSmax - LastTS_i)(tcc·Nstep·RateGran))}
                      CellCount_i = 0
                      LastTS_i = TSnow
                      Forward the measured rate
           ENDIF
ENDIF
```

FIG 1

```
IF Measurement_Started_i = FALSE
THEN Measurement_Started_i = TRUE
     LastTS_i = TSnow
     CellCount_i = 0
ELSE CellCount_i = CellCount_i + 1
ENDIF
IF CellCount_i ≥ N
THEN IF ((TSnow > LastTS_i) AND
        ((CellCount_i = CellCountMax) OR (TSnow - LastTS_i ≥ TImin)))
     THEN MeasRate_i = round {CellCount_i /(((TSnow - LastTS_i)(tcc·Nstep·RateGran))}
          CellCount_i = 0
          LastTS_i = TSnow
          Forward the measured rate
     ENDIF
     IF ((TSnow < LastTS_i) AND
        ((CellCount_i = CellCountMax) OR (TSnow + TSmax - LastTS_i ≥ TImin)))
     THEN MeasRate_i = round {CellCount_i /(((TSnow + TSmax - LastTS_i)(tcc·Nstep·RateGran))}
          CellCount_i = 0
          LastTS_i = TSnow
          Forward the measured rate
     ENDIF
ENDIF
```

FIG 2

```
IF Measurement_Started_i = TRUE
THEN IF ((TSnow > LastTS_i) AND (TSnow - LastTS_i ≥ TImax))
     THEN MeasRate_i = round {CellCount_i /((TSnow - LastTS_i)(tcc·Nstep·RateGran))}
          Forward the measured rate
          IF MeasRate_i < InactiveRate
          THEN Measurement_Started_i = FALSE
          ELSE CellCount_i = 0
               LastTS_i = TSnow
          ENDIF
     ENDIF
     IF ((TSnow < LastTS_i) AND (TSnow + TSmax - LastTS_i ≥ TImax))
     THEN MeasRate_i = round {CellCount_i /((TSnow + TSmax - LastTS_i)(tcc·Nstep·RateGran))}
          Forward the measured rate
          IF MeasRate_i < InactiveRate
          THEN Measurement_Started_i = FALSE
          ELSE CellCount_i = 0
               LastTS_i = TSnow
          ENDIF
     ENDIF
ENDIF
```

METHOD FOR MEASURING ATM CELL RATES

BACKGROUND OF THE INVENTION

1. Field of the Invention

The invention is directed to a method for measuring ATM cell rates in networks having a switching systems in which the frequency of occurrence of incoming ATM cells is call-individually acquired.

2. Description of the Related Art

Calculating methods or algorithms for measuring the frequency of occurrence of ATM cells are often employed in the prior art.

However, these types of measurements are usually specifically adapted to the connection. For example, most of these measurements are implemented within a fixed time interval.

European Patent Application EP 0548 995 addresses a monitoring method with which incoming ATM cells are measured within a predetermined time span, but does not address the traffic characteristic of the ATM cells determines the measuring procedure.

SUMMARY OF THE INVENTION

The invention is based on the object of disclosing a flexible method for implementing ATM cell measurement. What is particularly advantageous about the invention is that the first step of a two-step measuring method is triggered by incoming ATM cells. It is also advantageous that no fixed measuring time interval is provided. The ATM cells themselves or, respectively, the traffic characteristic are the criteria as to when the measurement is implemented.

Advantageous developments of the invention are recited below.

BRIEF DESCRIPTION OF THE DRAWINGS

The invention is explained in greater detail below with reference to an exemplary embodiment.

FIG. 1 is a structured English diagram of the first step of the inventive, two-step measuring method (main part);

FIG. 2 is a structured English diagram of the second step of the inventive two-step measuring method (refresh part).

DESCRIPTION OF THE PREFERRED EMBODIMENTS

The inventive method is based on the following assumptions:

ATM cells are supplied to the switching system in a fixed time rhythm (slotted link) on a trunk. At which the actual measuring procedure is started. The measuring result can be co-utilized by other algorithms. The time for a cell cycle on the trunk is represented by a quantity tcc and is measured in seconds. The cell rate is thus measured as a whole-number quantity in units of RateGran cells per second. A typical application is established when RateGran=32 applies. The quantity RateGran is a whole number and determines the granularity of the measured rate. When the quantity RateGran is 1, the rates are measured in cells per second.

The calculating method employs common variables Tsmax, Tsnow, Timin, CellCountMax, InactiveRate, RateGran, N for all connections. These variables are defined by the following table:

| | |
|---|---|
| TSmax | maximum value that the time variables can assume; whole number values only |
| TSnow | current time; whole-numbered value between 0 and TSsmax-1; initial value = 0 and is incremented by 1 after every Nstep (a whole-numbered value) cell cycle; set to 0 when TSmax is reached in this operation |
| TImin | determines the minimum time interval between measurements for the same connection, which must be adhered to when fewer than CellCountMax cells for this connection have arrived since the last measurement (for this connection). The variable TImin is calculated in units of the variable tcc multiplied by the variable Nstep |
| CellCount Max | maximum plurality of cells per connection that can arrive between two measurements for the same connection without having to implement a rate calculation |
| InactiveRate | cell rate below which a connection can be considered inactive; units are RateGran cells per second |
| RateGran | whole-numbered value units, for rate values; the rate should be measured as a whole-numbered value in units of RateGran times cell per second |
| N | number of cells that must arrive for a connection since the last measurement before the next measurement is started (usually) |

Connection-individual variables

| | |
|---|---|
| Measure-ment_Started | Boolean True- connection not inactive False-connection inactive input value at connection setup is False |
| LastTS | last cell cycle for which the measuring interval was started input value at connection setup irrelevant |
| CellCount | plurality of cells that have arrived since the last measurement for this connection input value at connection setup irrelevant |

There is an algorithm parameter set for each connection that requires a rate measurement. The algorithm is composed of a total of two parts: a main part and a refresh part.

FIG. 1 shows the executive sequence of the main part that is started at the arrival of each and every cell for which a rate measurement is to be implemented. The parameter set of the appertaining connection is used by this sequence.

FIG. 2 shows the executive sequence of the refresh part. The refresh part is cyclically implemented for all connections within a time interval T_refresh. Which is greater than the variable TImin. Likewise, the sum of the variable TImax and the variable T_refresh is smaller than the variable TSmax. The refresh is required in order to assure that a measurement occurs for each connection before TSnow again reaches the specific value LastTS for this connection which can happen when no ATM cell arrives for the connection within a time interval having the length TSmax. The refresh prevents problems that arise due to the selection of a finite time interval (i.e., a wrap around problem with the time marking LastTS). The main part of the algorithm and the refresh part of the algorithm can be controlled together in a cell cycle. However, this can only apply to different connections.

As can be derived from FIG. 1, roundings are implemented by a function round {x}. Round {x} determines a whole-numbered quantity that is closest to the value x. Round {n+½}=n+1 is likewise set for a whole number n. In other versions of the same algorithm, the round function could be replaced by rounding to the whole-numbered part of a number (i.e, truncating all fractional portions) would then denote the highest whole value that is less than or equal to the number x.

The measurement of the cell cycle is then characterized as follows:

The algorithm uses a Boolean variable Measurement_Started per connection. When this variable assumes the value "true", the beginning of the measuring interval is selected. Otherwise, the beginning is not selected the case. When a connection is setup, the value "false" is allocated to this variable. It is also set to "false" when a measurement has shown that the connection has become inactive.

When an ATM cell arrives and the variable Measurement_Started for the appertaining connection was set to "false" (e.g, when the first ATM cell of a connection arrives or when the first ATM cell of a connection arrives after a long inactive time (idle time) for this connection), the measurement is started in that the beginning of the measuring interval LastTs=TSnow is set and in that the variable CellCount for this connection is set to 0.

When an ATM cell arrives and the variable Measurement_Started is set to "true", then the variable CellCount for this connection is incremented by 1.

When an ATM cell for a specific connection arrives, a calculation of the rate MeasRate to be measured for this connection is implemented when the following is valid:

At least N cells for the connection have arrived since the beginning of the measurement and the variable CellCount for the connection is equal to the variable CellCountMax or the variable TSnow has been incremented at least by the value TImin since the beginning of the measurement. This means that the variable TSnow was incremented at least by the variable TImin since the measurement for this connection was started. This also means that approximately the time TImin·tcc·Nstep has elapsed since the measurement was started.

The following calculations take place when a measurement of the measured rate is to be implemented for a connection i:

$MeasRate_i = round\ \{CellCount_i/((TSnow-.LastTS_i)\cdot(tcc\cdot Nstep\cdot RateGran))\}$ or $MeasRate_i = round\ \{CellCount_i/((TSnow+TSmax-LastTS_i)\ (tcc\cdot Nstep\cdot RateGran))\}$.

The first line is used when the calendar has not wrapped since the measurement was started at $LastTS_i$, meaning that $TSnow > LastTS_i$ applies.

The second line is used when the calendar has wrapped since the measurement was started, meaning that $TSnow < LastTS_i$ applies. The unit of the calculated quantity is RateGran cells per second.

The refresh part of the algorithm is cyclically implemented for all connections within a time interval T_refresh in units of tcc·Nstep. The refresh part is not implemented for a connection in a cell cycle for which a cell arrives for the same connection. The sum of the variables TImax and T_refresh is smaller than the variable TSmax. The refresh part is only implemented for connections for which a measurement has been started.

When a refresh is calculated for a connection, the calculation of the measured quantity MeasRate for the connection is only implemented when the variable TSnow was incremented by at least TImax since the beginning of the measurement for this connection. This means that at least the time interval TImax·tcc ·Nstep must have elapsed since the beginning of the connection.

When a measured rate was calculated by the refresh part and when the measured rate lies below a value InactiveRate, then the connection is considered inactive, and the variable Measurement_Started is set to "false" for this connection. This means that the next measurement for this connection is only started upon arrival of the next ATM cell for this connection.

When a rate measured by the refresh part was calculated for the connection i and this measured rate is not below the value of the variable InactiveRate, then this connection is considered active. The next measurement is started immediately in that the following values are set:

$CellCount_i=0$ and $LastTs_i=TSnow$.

The algorithm also allows a compromise (a trade-off in terms) in view of the precision of the measurement for a memory reduction for the time variables. This is achieved by a suitable selection of the variable Nstep. The variable TSmax is all the smaller the higher the variable Nstep is, and the range of the variable TSnow is to be selected between these values; however, the measurement becomes less exact for high values Nstep. Conversely, when Nstep=1 applies, the measurement is most precise; however, the memory requirement is highest for this situation.

Finally, the algorithm is to be modified when the rate to be measured is measured as a real variable in cells per second. In this case, the variable RateGran is set to 1 and the trunc function is omitted.

The above-described circuit apparatus is illustrative of the principles of the present invention. Numerous modifications and adaptions thereof will be readily apparent to those skilled in this art without departing from the spirit and scope of the present invention.

What is claimed is:

1. A method for measuring ATM cell rates in a network having a switching system wherein a frequency of occurrence of incoming ATM cells is call-individually acquired comprising the steps of:

starting a main part execution upon arrival of a plurality of ATM cells according to a criterion selected from the group consisting of: a) a time threshold TImin that exceeds a predetermined threshold, and b) a frequency threshold CellCountMax that is representative of said frequency of occurrence of said incoming ATM cells that exceeds a predetermined threshold; and starting a refresh part execution when a predetermined time span has been exceeded;

wherein said frequency threshold CellCountMax reflects a maximum plurality of cells per connection that can arrive between two measurements for said same connection without having to implement a rate calculation; and wherein said time threshold TImin is defined as a value between 2 measurements for a connection that must be adhered to when fewer cells than said frequency threshold CellCountMax have arrived for this connection since a last measurement.

2. A method according to claim 1, wherein:

a measurement for a connection is started before a permanently prescribed plurality of ATM cells is reached.

3. A method according to claim 1, wherein a next measuring interval after a long inactive phase is only restarted with an arrival of a first ATM cell.

4. A method according to claim 1, wherein a measurement for a connection is started before a first predetermined time span is reached when a predetermined plurality of ATM cells has arrived since a beginning of a measurement for said connection and at least a second predetermined time span has elapsed at the same time.

* * * * *